United States Patent
Miyatake et al.

(10) Patent No.: US 9,110,242 B2
(45) Date of Patent: Aug. 18, 2015

(54) LIQUID CRYSTAL DISPLAY, LAMINATED POLARIZING PLATE AND POLARIZED LIGHT SOURCE DEVICE

(75) Inventors: Minoru Miyatake, Ibaraki (JP); Taku Yamada, Ibaraki (JP); Kuniaki Ishibashi, Osaka (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 13/476,743

(22) Filed: May 21, 2012

(65) Prior Publication Data

US 2012/0229735 A1 Sep. 13, 2012

Related U.S. Application Data (62) Division of application No. 12/304,578, filed as application No. PCT/JP2008/061045 on Jun. 17, 2008.

(30) Foreign Application Priority Data

Jun. 29, 2007 (JP) ................................. 2007-172632
Apr. 16, 2008 (JP) ................................. 2008-107134

(51) Int. Cl.
*G02F 1/1335* (2006.01)
*G02B 5/30* (2006.01)
*G02F 1/13363* (2006.01)

(52) U.S. Cl.
CPC ............ *G02B 5/3025* (2013.01); *G02B 5/3083* (2013.01); *G02F 1/13363* (2013.01)

(58) Field of Classification Search
CPC .................................................. G02F 1/13363
USPC .......................... 349/61–65, 96–98, 117–119
See application file for complete search history.

(56) References Cited

U.S. PATENT DOCUMENTS 6,191,833 B1 2/2001 Hirakata
6,379,758 B1 4/2002 Hanmer et al.
(Continued)

FOREIGN PATENT DOCUMENTS

EP 1498768 A1 1/2005
JP 04-305602 A 10/1992
(Continued)

OTHER PUBLICATIONS

Chinese Office Action dated Nov. 26, 2012, issued in corresponding Chinese Patent Application No. 201110035103.8, with English translation (8 pages).
(Continued)

*Primary Examiner* — Dung Nguyen
(74) *Attorney, Agent, or Firm* — Westerman, Hattori, Daniels & Adrian, LLP (57) ABSTRACT

This invention relates to a transmissive liquid crystal display including a light source (BL), a reflective linearly-polarizing layer (Pr1), a birefringent layer (A) having specific optical properties and specific retardation properties, a light source-side absorptive linearly-polarizing layer (P1), a liquid crystal cell (LC), and a viewer-side linearly-polarizing layer (P2) which are arranged in this order. In the transmissive liquid crystal display of the invention, light leakage is suppressed in oblique directions so that black brightness can be reduced. A reduction in contrast in the normal direction can also be suppressed, which is caused by the distribution of light to the normal direction.

8 Claims, 8 Drawing Sheets

(56) References Cited

U.S. PATENT DOCUMENTS

| | | | |
|---|---|---|---|
| 6,654,081 B2 | 11/2003 | Kawamoto et al. | |
| 7,317,498 B2 | 1/2008 | Hara et al. | |
| 7,466,382 B2* | 12/2008 | Yano et al. | 349/118 |
| 7,599,029 B2* | 10/2009 | Shibazaki | 349/120 |
| 2003/0193635 A1* | 10/2003 | Mi et al. | 349/117 |
| 2003/0193636 A1 | 10/2003 | Allen et al. | |
| 2004/0239852 A1 | 12/2004 | Ono et al. | |
| 2005/0180017 A1 | 8/2005 | Hara et al. | |
| 2006/0262401 A1 | 11/2006 | Takahashi et al. | |
| 2006/0290847 A1 | 12/2006 | Kim | |
| 2007/0030415 A1 | 2/2007 | Epstein | |
| 2008/0266500 A1 | 10/2008 | Nimura | |
| 2009/0153784 A1 | 6/2009 | Kiya | |
| 2009/0231520 A1* | 9/2009 | Uchiyama et al. | 349/96 |

FOREIGN PATENT DOCUMENTS

| | | |
|---|---|---|
| JP | 04-371903 A | 12/1992 |
| JP | 2000-187205 A | 7/2000 |
| JP | 2003-207634 A | 7/2003 |
| JP | 2004-004764 A | 1/2004 |
| JP | 2004-020943 A | 1/2004 |
| JP | 2004-184575 A | 7/2004 |
| JP | 2007-4182 A | 1/2007 |
| JP | 2008-26781 A | 2/2008 |
| JP | 2008-090288 A | 4/2008 |
| TW | 2007-07012 A | 2/2007 |
| WO | 2007-057998 A1 | 5/2007 |

OTHER PUBLICATIONS

Japanese Office Action dated Jan. 8, 2013, issued in corresponding Japanese patent application No. 2008-107134, w/ English translation.
Notification of Transmittal of Translation of the International Preliminary Report on Patentability (Form PCT/IB/338) of International Application No. PCT/JP2008/061045 mailed Feb. 4, 2010 with Forms PCT/IB/373 and PCT/ISA/237.
Chinese Office Action dated Sep. 21, 2010, issued in corresponding Chinese Patent Application No. 2008-80000478.7.
Taiwan Office Action dated Dec. 30, 2011, issued in corresponding Taiwan Patent Application No. 097123396.
International Search Report of PCT/JP2008/061045, date of mailing Aug. 5, 2008.
Chinese Office Action dated Feb. 14, 2012, issued in corresponding Chinese Patent Application No. 201110035103.8.
US Office Action dated Dec. 23, 2011, issued in corresponding U.S. Appl. No. 12/304,578.
US Office Action dated Apr. 30, 2013, issued in corresponding U.S. Appl. No. 12/304,578.
US Office Action dated Jul. 22, 2011, issued in corresponding U.S. Appl. No. 12/304,578.
Chinese Office Action dated May 31, 2013, issued in corresponding Chinese Patent Application No. 201110035103.8 (with English translation).
US Office action dated Aug. 20, 2013, issued in corresponding U.S. Appl. No. 12/304,578.
Japanese Office Action dated Oct. 2, 2013, issued in corresponding Japanese Patent Application No. 2013-041027, w/ English translation.
Office Action dated Jun. 11, 2014, issued in corresponding Chinese Patent Application No. 201110035103.8, with English Translation (16 pages).
Office Action dated May 20, 2014, issued in corresponding Taiwanese Patent Application No. 101111525, with English Translation (10 pages).
US Office action dated Jun. 30, 2014, issued in corresponding U.S. Appl. No. 12/304,578.
Decision of the Intellectual Property Office dated Jan. 20, 2015, issued in corresponding Taiwanese Patent Application No. 101111525, with English translation (7 pages).
Chinese Office Action dated Oct. 29, 2014, issued in corresponding Chinese Application No. 201110035103.8; w/English Translation. (29 pages).
U.S. Final Office Action dated Jan. 23, 2015, issued in U.S. Appl. No. 12/304,578 (16 pages).

* cited by examiner

LIQUID CRYSTAL DISPLAY, LAMINATED POLARIZING PLATE AND POLARIZED LIGHT SOURCE DEVICE

CROSS-REFERENCE TO RELATED APPLICATION

This application is a continuation of U.S. patent application Ser. No. 12/304,578, filed on Dec. 12, 2008, which is a National Stage Application of PCT/JP2008/06.1045, filed Jun. 17, 2008, which claims the benefit of priority under 35 U.S.C. §119(a) of Patent Application Nos. 2007-172632 and 2008-107134 filed in Japan on Jun. 29, 2008, and Apr. 16, 2008, respectively, the entire contents of which are hereby incorporated by reference.

TECHNICAL FIELD

The invention relates to a transmissive liquid crystal display with high contrast and reduced dark-state brightness and to a laminated polarizing plate and a polarized light source device each for use in such a display.

BACKGROUND ART

Transmissive liquid crystal display has a structure including two polarizing plates with their absorption axes perpendicular to each other (namely arranged in cross Nicol) and a liquid crystal cell interposed between the two polarizing plates. Such liquid crystal displays have a problem in which when viewed from oblique directions, they produce light leakage so that they cannot produce black display, because the apparent angle between the absorption axes of the two polarizing plates is larger than 90° when viewed from oblique direction. Particularly when the screen is obliquely viewed at an azimuth angle of 45° with respect to the absorption axes of the polarizing plates arranged in cross-Nicol, light leakage is significant.

A known method to solve such a problem includes placing an optical compensation layer of a retardation plate or the like between the two orthogonal polarizing plates to change the polarization state, thereby reducing light leakage in oblique directions (see for example Patent Documents 1 and 2). Even when using such an optical compensation layer, however, it has been difficult to completely prevent light leakage in oblique view. There is also another problem in which even though light leakage is reduced using the optical compensation layer, light obliquely incident on the liquid crystal cell can be refracted, reflected, diffracted, or scattered at the interface between various materials such as TFT materials and antiglare layers constituting the liquid crystal display, and part of the light can also be distributed to the normal direction, so that contrast can be reduced not only in oblique directions but also the normal direction.

Another method may also be applied which includes using a diffusing plate or the like in order to distribute leaked light in oblique directions over a wide angle range (see for example Patent Document 3). However, such a method also distributes light to the normal direction where the contrast is originally high, so that the contrast in the normal direction can be reduced. Therefore, such a method has little practical value.

Patent Document 1: Japanese Patent Application Laid-Open (JP-A) No. 04-305602
Patent Document 2: JP-A No. 04-371903
Patent Document 3: JP-A No. 2000-187205

DISCLOSURE OF INVENTION

Problems to be Solved by the Invention

In view of the above, an object of the invention is to provide a transmissive liquid crystal display in which black brightness is reduced by prevention of light leakage in oblique directions and in which a reduction in contrast in the normal direction is also suppressed, which is caused by the distribution of light to the normal direction, a laminated polarizing plate and a polarized light source device each for use in the transmissive liquid crystal display.

Means for Solving the Problems

As a result of intense investigations, the inventors have found that when a specific polarizing layer is placed on the light source side of a transmissive liquid crystal display, light obliquely incident on the liquid crystal cell is prevented so that the above problems can be solved, and have finally completed the invention. Specifically, the invention is directed to a transmissive liquid crystal display including a light source BL, a reflective linearly-polarizing layer Pr1, a birefringent layer A, a light source-side absorptive linearly-polarizing layer P1, a liquid crystal cell LC, and a viewer-side linearly-polarizing layer P2 which are arranged in this order and satisfy all the following conditions:

(a) the transmission axes of the reflective linearly-polarizing layer Pr1 and the light source-side absorptive linearly-polarizing layer P1 are arranged substantially parallel to each other;

(b) the birefringent layer has a thickness direction retardation Rth which satisfies the relation 250 nm≤Rth≤6000 nm; and (c) of linearly polarized light emitted from the light source BL and transmitted through the reflective linearly-polarizing layer Pr1, the birefringent layer A makes substantially no change in the polarization state of linearly polarized light in the normal direction while the birefringent layer A makes a change in the polarization state of linearly polarized light in an oblique direction.

Furthermore, in the transmissive liquid crystal display of the invention, it is preferred that the birefringent layer A has an in-plane retardation Re of from 10 nm to 100 nm, and the slow axis of the birefringent layer A and the transmission axis of the reflective linearly-polarizing layer Pr1 are substantially parallel or perpendicular to each other. Further, in the transmissive liquid crystal display of the invention, it is also a preferred constitution that the birefringent layer A has an in-plane retardation Re of 20 nm or less.

Furthermore, in an embodiment of the transmissive liquid crystal display of the invention, it is preferred that the birefringent layer A has an in-plane retardation Re and a thickness direction retardation Rth which satisfy the relation: 400 nm≤Rth−2×Re≤800 nm.

Furthermore, in the transmissive liquid crystal display of the invention, it is preferred that the transmissive liquid crystal display includes a reflective linearly-polarizing layer Pr2 between the birefringent layer A and the light source-side absorptive linearly-polarizing layer P1 in such a manner that the light source-side absorptive linearly-polarizing layer P1 and the transmission axes are parallel to each other.

Furthermore, in the transmissive liquid crystal display of the invention, it is preferred that the transmissive liquid crystal display includes a light diffusing layer between the birefringent layer A and the light source-side absorptive linearly-polarizing layer P1 and/or on the viewer side from the viewer-side linearly-polarizing layer P2.

Furthermore, in the transmissive liquid crystal display of the invention, it is preferred that the reflective linearly-polarizing layer Pr1, the birefringent layer A and the light source-side absorptive linearly-polarizing layer P1 are integrally bonded to one another with a pressure-sensitive adhesive.

The invention is furthermore directed to a laminated polarizing plate and a polarized light source device each for use in the transmissive liquid crystal display.

DESCRIPTION OF REFERENCE SYMBOLS

Pr1 reflective linearly-polarizing layer
Pr2 reflective linearly-polarizing layer
P1 light source-side absorptive linearly-polarizing layer
P2 viewer-side linearly-polarizing layer
A birefringent layer
BL light source
LC liquid crystal cell,
D1 light source-side light-diffusing layer
D2 viewer-side light-diffusing layer.

BEST MODE FOR CARRYING OUT THE INVENTION

The transmissive liquid crystal display of the invention includes a light source BL, a reflective linearly-polarizing layer Pr1, a birefringent layer A, a light source-side absorptive linearly-polarizing layer P1, a liquid crystal cell LC, and a viewer-side linearly-polarizing layer P2 placed in this order.

The reflective linearly-polarizing layer Pr1 can transmit light polarized in a specific direction out of natural polarized light emitted from the light source and can reflect light polarized in a direction orthogonal thereto. Examples of the reflective linearly-polarizing layer Pr1 which may be used include a grid polarizer, a multilayer thin film laminate including two or more layers of two or more materials different in refractive index, a vapor-deposited multilayer thin film having different refractive indices, which is used for beam splitters and the like, a birefringent multilayer thin film laminate including two or more birefringent layers of two or more birefringent materials, and a stretched resin laminate including two or more layers made of two or more birefringent resins. Among them, the stretched resin laminate including two or more layers made of two or more birefringent resins as disclosed in Japanese Patent Application National Publication (Laid-Open) No. 09-506837 is preferably used. For example, the product commercially available under the trade name "D-BEF" from 3M Company may be used as the reflective linearly-polarizing layer.

The birefringent layer A has the function of changing the polarization state of the linearly polarized light transmitted through the reflective linearly-polarizing layer Pr1. Although the mechanism to prevent light leakage in oblique directions is described later, the birefringent layer A is required not to substantially change the polarization state of light in the normal direction, namely the direction where the polar angle is 0° and required to change the polarization state of light in oblique directions, namely directions where the polar angle is not 0°. In particular, the incident linearly-polarized light in a direction where light leakage can be significant in the transmissive liquid crystal display is preferably converted into light linearly polarized in a direction orthogonal thereto by the birefringent layer A.

Here, in order not to convert the polarization state of the light in the normal direction, the birefringent layer A should satisfy any one of the following conditions: (i) it has a slow axis substantially parallel or perpendicular to the absorption axis of the reflective linearly-polarizing layer Pr1; and (ii) it has substantially no in-plane retardation, specifically has an in-plane retardation Re of 20 nm or less.

Further, in order to convert the polarization state of light in an oblique direction into linearly polarized light in a direction orthogonal thereto, the birefringent layer A should have a slow axis at an angle of 45° relative to the transmission axis of the reflective linearly-polarizing layer Pr1 and have a retardation of half a wavelength (for example, a retardation of 275 nm at a light wavelength of 550 nm), when viewed from the oblique direction. For example, in order that light with an azimuth angle $\phi$ of 45° and a polar angle $\theta$ of 60° which can cause most significant light leakage in a general transmissive liquid crystal display may be converted into linearly polarized light in a direction orthogonal thereto, the birefringent layer A to be used preferably has substantially no in-plane retardation and has a retardation in a range of 400 to 800 nm in its thickness direction. Here, while the phrase "substantially no in-plane retardation" means an in-plane retardation of 20 nm or less, as mentioned above, the in-plane retardation is more preferably 10 nm or less.

In practical liquid crystal displays, the angle dependency of light leakage may vary with the type of the liquid crystal cell used, the presence of optical films for compensating for the birefringence of the liquid crystal cell, or the like. Therefore, the optical properties of the birefringent layer A should be determined to be compatible with such conditions. For example, when the liquid crystal cell is a twisted nematic (TN) mode liquid crystal cell, a retardation of $\lambda/2$ is preferably produced in an oblique direction as mentioned above, and in this regard, the retardation in the thickness direction is preferably from 250 nm to 1000 nm, more preferably from 300 nm to 900 nm, and even more preferably from 350 nm to 800 nm.

Further, in order that most significant light leakage at an azimuth angle $\phi$ of 45° and a polar angle $\theta$ of 60° may be effectively prevented in a general transmissive liquid crystal display, as described above, the retardation that is determined when the birefringent layer is observed from this direction is preferably half a wavelength, specifically about 275 nm at a light wavelength of 550 nm. From these points of view, the in-plane retardation Re and the thickness direction retardation Rth preferably satisfy relation (1), more preferably relation (2), and even more preferably relation (3), as shown below.

$$400 \leq Rth - 2 \times Re \leq 800 \quad (1)$$

$$450 \leq Rth - 2 \times Re \leq 750 \quad (2)$$

$$500 \leq Rth - 2 \times Re \leq 700 \quad (3)$$

In order to effectively prevent light leakage at an azimuth angle $\phi$ of 45°, the in-plane retardation is preferably as small as possible. In contrast, in order to effectively prevent light leakage at an azimuth angle $\phi$ other than 45°, the birefringent layer to be used may have a certain in-plane retardation. Such a retardation is preferably 100 nm or less, more preferably 90 nm or less, and even more preferably 80 nm or less, because a too high level of in-plane retardation can reduce the effect of preventing light leakage in oblique directions, particularly in the direction where $\phi$ is 45°.

On the other hand, when the liquid crystal cell is a vertically-aligned (VA) mode liquid crystal cell, the birefringent layer A preferably has a thickness direction retardation of 500 nm to 6000 nm, more preferably of 600 nm to 5000 nm, and even more preferably of 600 nm to 4000 nm, and the in-plane retardation is preferably 20 nm or less, and more preferably 10 nm or less. When the retardation is within the above range, the liquid crystal display on which black images are displayed can be reduced in light leakage in oblique directions, and the screen on which white images are displayed can be prevented from coloration, which is caused by retardation interference.

Here, in the specification, the in-plane retardation Re and the thickness direction retardation Rth are expressed as follows: $Re=(nx-ny) \times d$, $Rth=|(nx-nz)| \times d$, wherein nx is an in-plane refractive index in the slow axis direction of the birefringent layer, ny is a refractive index in the fast axis direction, nz is a refractive index in the thickness direction, and d is the thickness of the birefringent layer, and $|(nx-nz)|$ is the absolute value of $(nx-nz)$. Unless otherwise stated, Re and Rth are each a value at a measurement wavelength of 550 nm.

Any materials or methods which can produce the characteristics described above may be used to form the birefringent layer A. Examples thereof include such as a layer of a cholesteric liquid crystal having a selective reflection wavelength outside the visible light region (380 nm to 780 nm) and having a fixed planar alignment, a layer of a rod-shaped liquid crystal having a fixed homeotropic alignment, a layer based on a discotic liquid crystal having columnar or nematic alignment, a layer including an in-plane aligned crystal with negative uniaxiality, an aligned polymer layer, an alignment film composed of a liquid crystal material such as a liquid crystal polymer, a layer including an aligned layer of a liquid crystal material supported on a film, and a layer produced by appropriately stretching any of these materials.

The layer of a cholesteric liquid crystal having a fixed planar alignment preferably has a selective reflection wavelength in a region outside the visible light region in order to have no coloring abnormality in the visible light region with respect to a selective reflection wavelength of a cholesteric liquid crystal. Hence, a necessity arises for a selective reflection light not to be in the visible region. Selective reflection is specially determined by a cholesteric chiral pitch and a refractive index of a liquid crystal. A value of a central wavelength in selective reflection may be in the near infrared region, whereas it is more desirably in an ultraviolet region of 350 nm or less because of an influence of optical rotation exerted or occurrence of a slightly complex phenomenon.

The layer of a rod-shaped liquid crystal having a fixed homeotropic alignment may be a liquid crystalline thermoplastic resin showing a nematic liquid crystallinity at a high temperature; a polymerized liquid crystal obtained by polymerizing a liquid crystal monomer and an alignment agent, when required, under illumination with ionizing radiation such as an electron beam, ultraviolet or the like, or with heating;

or a mixture thereof. While a liquid crystallinity may be either lyotropic or thermotropic, a thermotropic liquid crystal is desirable from the view point of ease of control and formability of monodomain. A homeotropic orientation is obtained for example in a procedure in which a birefringent material described above is coated on a film made of a vertically aligned film (such as a film of a long chain alkylsilane) and a liquid crystal state is produced and fixed in the film.

As the layer using a discotic liquid crystal, there is available a plate obtained by producing and fixing a nematic phase or a columnar phase in a discotic liquid crystal material having an optically negative uniaxiality such as a phthalocyanines or a triphenylene compounds each having an in-plane spread molecule as a liquid crystal material. Inorganic layered compounds each with a negative uniaxiality are detailed in a publication of JP-A No. 6-82777 and others.

The birefringent layer including an aligned polymer layer may be obtained by a method using an appropriate polymer material such as polycarbonate, norbornene-based resin, polyvinyl alcohol, polystyrene, poly(methyl methacrylate), polypropylene or any other polyolefin, polyarylate, polyamide, or polyimide to form a polymer material solution and applying the solution to a substrate to be aligned; a method of stretching a film made of such a polymer material; a method of pressing such a polymer material; or a method of cutting from a crystalline product including such a polymer material aligned in parallel.

The in-plane retardation and the thickness direction retardation of the birefringent layer may be adjusted by a known method such as coating conditions, stretching conditions or adjustment of thickness.

The light source-side absorptive linearly-polarizing layer P1 to be used may be generally a polarizing plate including a protective film placed on one or both sides of the absorptive linearly-polarizing layer.

The absorptive linearly-polarizing layer to be used may be of any type without particular limitations. For example, the absorptive linearly-polarizing layer may be a product produced by adsorbing a dichroic material such as iodine or a dichroic dye on a hydrophilic polymer film such as a polyvinyl alcohol-based film, a partially-formalized polyvinyl alcohol-based film, or a partially-saponified ethylene-vinyl acetate copolymer film and uniaxially stretching the film or may be a polyene-based aligned film such as a dehydration product of polyvinyl alcohol or a dehydrochlorination product of polyvinyl chloride or the like. Among them, a polarizing layer composed of a polyvinyl alcohol-based film and a dichroic material such as iodine is preferred. The thickness of the polarizing layer is not particularly limited, and is generally about 5 to about 80 μm.

For example, the polarizing layer including a uniaxially-stretched polyvinyl alcohol-based film dyed with iodine may be produce by immersing a polyvinyl alcohol-based film in an aqueous iodine solution to dye the film and stretching the film to 3 to 7 times the original length. If necessary, the polyvinyl alcohol-based film may be immersed in an aqueous solution of potassium iodide or the like optionally containing boric acid, zinc sulfate, zinc chloride, or the like. Furthermore, if necessary, the polyvinyl alcohol-based film may be immersed in water for washing, before dyeing. If the polyvinyl alcohol-based film is washed with water, along with dirt on the surface of the polyvinyl alcohol-based film or an antiblocking agent can be removed, and the polyvinyl alcohol film can be allowed to swell so that unevenness such as uneven dyeing can also be effectively prevented. Stretching may be performed before, while or after dyeing with iodine. Stretching may also be performed in an aqueous solution of boric acid, potassium iodide or the like or in a water bath.

The transparent protective film placed on one or both sides of the polarizing layer is preferably made of a material superior to transparency, mechanical strength, thermal stability, moisture barrier properties, isotropy, or the like. Examples of polymers that may be used to form the transparent protective film include polyester-based polymers such as polyethylene terephthalate and polyethylene naphthalate; cellulose-based polymers such as diacetylcellulose and triacetylcellulose; acryl-based polymers such as poly(methyl methacrylate); styrene-based polymers such as polystyrene and acrylonitrile-styrene copolymers (AS resins); polycarbonate polymers; or the like. Further, polyolefin having a structure of such as polyethylene, polypropylene, and cyclo system- or norbornene; polyolefin-based polymers such as ethylene-propylene copolymers; vinyl chloride-based polymers; amide-based polymers such as nylon and aromatic polyamides; imide-based polymers; sulfone-based polymers; polyethersulfone-based polymers; poly(ether ether ketone)-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; or blends of any of the above polymers. A cured layer of thermosetting or ultraviolet-curable resin such as acryl-based, urethane-based, acrylic urethane-based, epoxy-based, or silicone-based resin may also be formed as the transparent protective film.

Further, the protective film to be used may also be a polymer film containing a resin composition containing a thermoplastic resin having a substituted and/or unsubstituted imide group in the side chain and a thermoplastic resin having a substituted and/or unsubstituted phenyl and nitrile groups in the side chain as disclosed in JP-A No. 2001-343529 (WO01/37007); a polymer film containing a lactone ring structure-containing (meth)acryl-based resin as disclosed in JP-A Nos. 2000-230016, 2001-151814, 2002-120326, 2002-254544, 2005-146084, and 2006-171464; a polymer film containing an acrylic resin having an alkyl unsaturated carboxylate structure unit and a glutaric anhydride structure unit as disclosed in JP-A Nos. 2004-70290, 2004-70296, 2004-163924, 2004-292812, 2005-314534, 2006-131898, 2006-206881, 2006-265532, 2006-283013, 2006-299005, and 2006-335902; a film containing a thermoplastic resin having a glutarimide structure as disclosed in JP-A Nos. 2006-309033, 2006-317560, 2006-328329, 2006-328334, 2006-337491, 2006-337492, 2006-337493, and 2006-337569 or the like. These films are preferred, because they have low retardation and low photoelastic coefficient so that they can avoid defects such as unevenness caused by polarizing plate distortion and because they have low moisture permeability so that they can highly resistant to moisture.

The thickness of the protective film is appropriately determined, and is generally from about 1 to about 500 μm in view of strength, workability such as handleability, thin layer-forming properties, or the like. In particular, it is preferably from 1 to 300 μm, and more preferably from 5 to 200 μm.

Further, the protective film is preferably as colorless as possible. Therefore, a protective film with a thickness direction retardation of 90 nm or less is preferably used. The use of the protective film with a thickness direction retardation of 90 nm or less can substantially avoid protective film-induced coloration (optical coloration) of the polarizing plate. The thickness direction retardation is more preferably 80 nm or less, and particularly preferably 70 nm or less.

In view of polarizing properties, durability and on the like, a cellulose-based polymer such as triacetylcellulose is preferably used as the protective film. A triacetylcellulose film is particularly preferred. Here, when the protective films are provided on both sides of the polarizing layer, the protective film to be used may be made of the same polymer material or may be made of the different polymer material on both sides.

Here, when the protective film on the reflective linearly-polarizing layer Pr1 side has a retardation, the in-plane retardation and the thickness direction retardation of the birefringent layer A are preferably adjusted in consideration of the value. Furthermore, the birefringent layer A may be as the protective film on the reflective linearly-polarizing layer Pr1 side. Such a structure has both the functions of a protective film and a birefringent layer and is preferred in view of a reduction in the number of components or easiness of optical design.

The polarizing layer and the protective film are generally bonded together with an aqueous pressure-sensitive adhesive or the like interposed therebetween. Examples of the aqueous adhesive include such as isocyanate-based adhesives, polyvinyl alcohol-based adhesives, gelatin-based adhesives, vinyl-based adhesives, latex-based adhesives, aqueous polyurethane adhesives, and aqueous polyester adhesives.

The reflection or absorption properties of the reflective or absorptive linearly-polarizing layer vary with wavelength. Therefore, it is difficult to produce completely neutral color. For example, the absorptive linearly-polarizing layer containing iodine can have a reddish brown hue due to its absorption properties. On the other hand, the retardation of the birefringent layer A varies with wavelength. Namely, the birefringent layer A has wavelength dispersion. Therefore, the birefringent layer A having a retardation of $\lambda/2$ (namely a phase difference of n) at a certain wavelength converts incident linearly polarized light into elliptically polarized light at wavelengths other than the certain wavelength, because the phase difference deviates from n, while it can convert incident linearly polarized light into linearly polarized light in a direction orthogonal thereto at the certain wavelength. At wavelengths other than the certain wavelength, therefore, light leakage can occur, which results in coloration. In the transmissive liquid crystal display of the invention, the birefringent layer may be used in such a manner that coloration due to the wavelength dispersion of the birefringent layer can be complementary to coloration due to the reflection or absorption properties of the reflective or absorptive linearly-polarizing layer, so that the hue can be controlled to produce neutral color. The wavelength dispersion of the birefringent layer may also be controlled by selecting the material to be used therein, or laminating two or more birefringent layers and then controlling by the methods described in such as JP-A Nos. 05-100114, 05-27118 and 05-27119.

Figure 1:
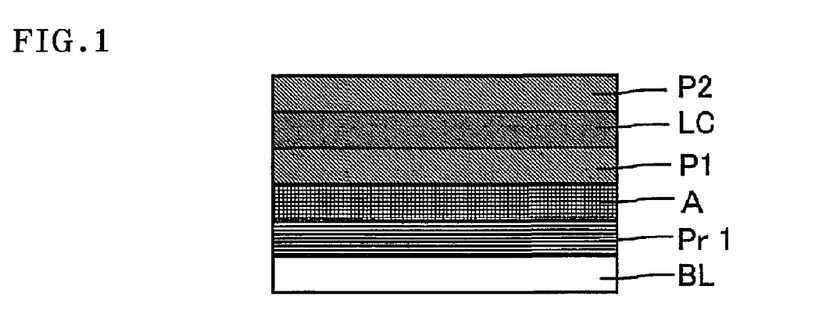
FIG. 1 is a schematic diagram showing an example of the cross-sectional structure of the transmissive liquid crystal display of the invention.
Figure 2A:
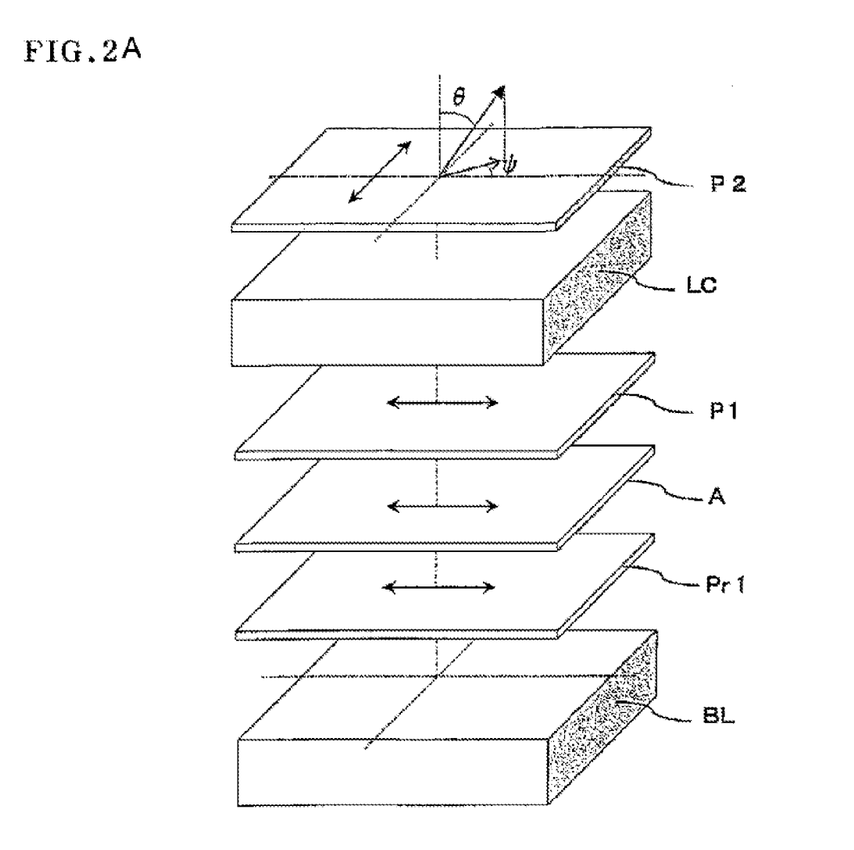
FIG. 2A and FIG. 2B shows an example of the placement angle of the respective layers of the transmissive liquid crystal display of the invention. The two-headed arrow attached to each polarizing layer indicates the direction of the transmission axis of the layer. The two-headed arrow attached to the birefringent layer A indicates the direction of the slow axis of the layer.
Figure 2B:
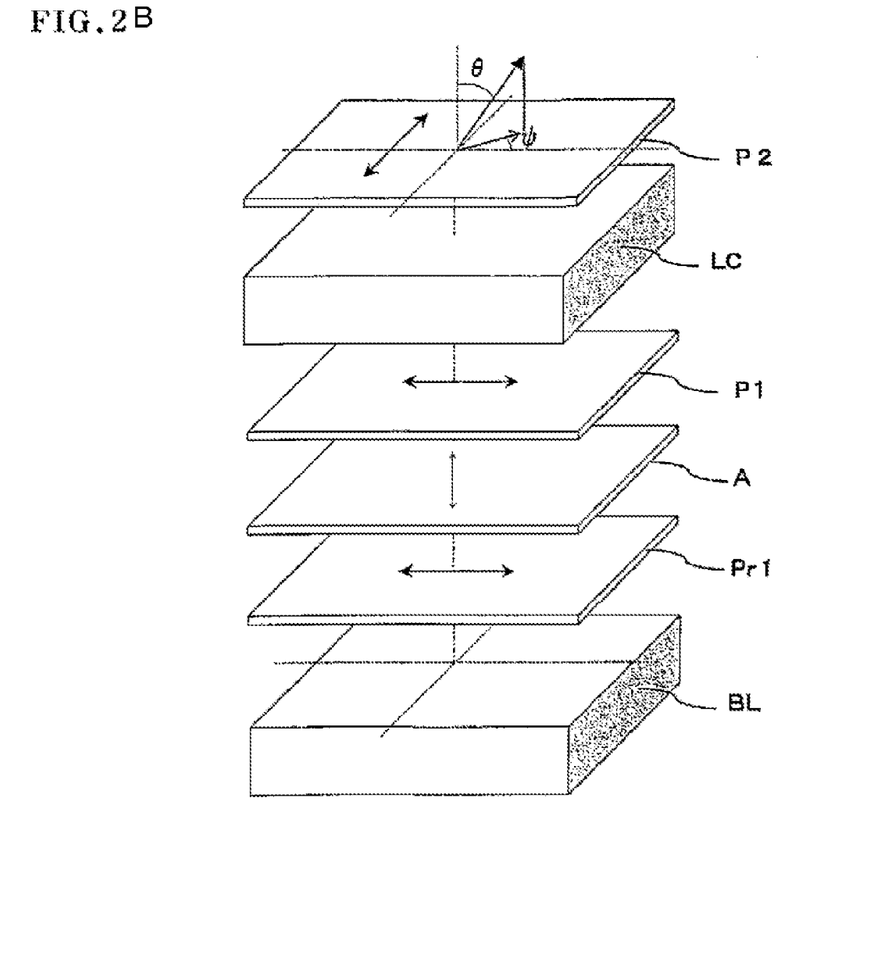

The transmissive liquid crystal display of the invention may have a cross-sectional structure and an arrangement of the respective layers as shown in FIGS. 1 and 2. In such a structure, light in the normal direction can maintain its intensity when entering the liquid crystal cell, but light in oblique directions is reduced in intensity when entering the liquid crystal cell, so that light leakage in oblique directions can be suppressed. This mechanism is described below with reference to FIG. 3 by following conversion of the respective light beams in the normal direction and oblique directions.

Figure 3:
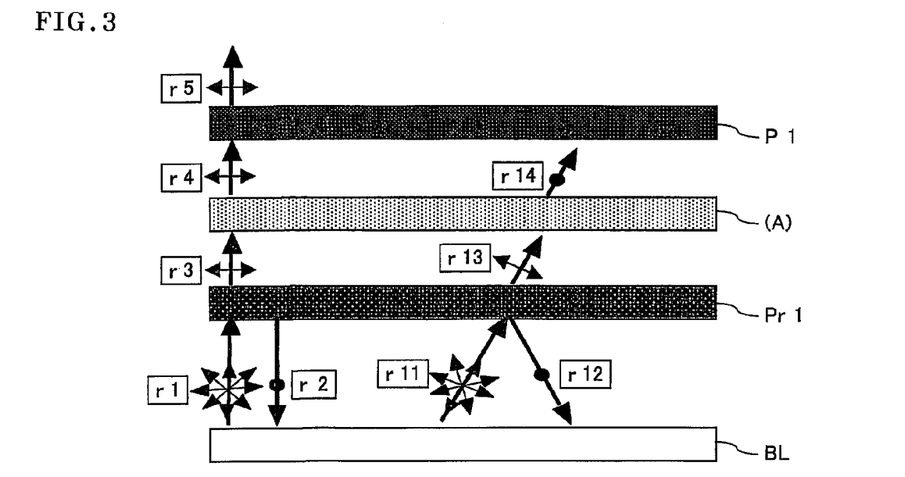
FIG. 3 is a schematic diagram showing an example of the basic mechanism in which the birefringent layer A maintains the intensity of light in the normal direction incident on the liquid crystal cell, but it reduces the intensity of light obliquely incident on the liquid crystal cell.

(1) Part r1 of natural light supplied from the light source BL is perpendicularly incident on the reflective linearly-polarizing layer Pr1.

(2) The reflective linearly-polarizing layer Pr1 transmits linearly polarized light r3 and reflects linearly polarized light r2 in a direction orthogonal thereto.

(3) The linearly polarized light r3 passes through the birefringent layer A. The birefringent layer A has a slow axis perpendicular or parallel to the polarization plane of the linearly polarized light r3, or the birefringent layer A has an in-plane retardation of substantially zero. Therefore, the polarization state of the linearly polarized light r3 is not converted so that the birefringent layer A transmits linearly polarized light r4.

(4) The direction of polarization of the linearly polarized light r4 passing through the birefringent layer A is parallel to the direction of the transmission axis of the light source-side absorptive linearly-polarizing layer P1. Therefore, it passes straight through the light source-side absorptive linearly-polarizing layer P1.

(5) Linearly polarized light r5 passing through the light source-side absorptive linearly-polarizing layer P1 enters the liquid crystal cell placed thereon and is transmitted without loss.

(6) On the other hand, part r11 of natural light supplied from the light source is obliquely incident on the reflective linearly-polarizing layer Pr1.

(7) The reflective linearly-polarizing layer Pr1 transmits linearly polarized light r13 and reflects light r12 linearly polarized in a direction orthogonal thereto.

(8) The linearly polarized light r13 passes through the birefringent layer A and is converted into a polarization state which varies with the incidence angle. At a specific incidence angle, the birefringent layer A has a retardation of $\lambda/2$ and therefore transmits linearly polarized light r14 which is orthogonal to the linearly polarized light r13.

(9) The direction of polarization of the linearly polarized light r14 passing through the birefringent layer A is perpendicular to the transmission axis of the light source-side absorptive linearly-polarizing layer P1. Therefore, it is absorbed by the light source-side absorptive linearly-polarizing layer P1.

(10) Thus, light in an oblique direction is not transmitted to the liquid crystal cell so that light leakage in the oblique direction can be suppressed when black is displayed.

(11) The linearly polarized lights r2 and r12 are allowed to return to the light source side and recycled. Therefore, light from the light source is efficiently used.

Figure 4:
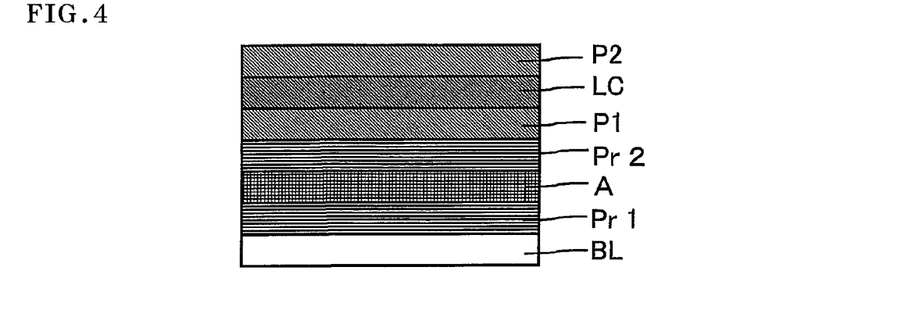
FIG. 4 is a schematic diagram showing an example of the cross-sectional structure of the transmissive liquid crystal display of the invention.
Figure 5:
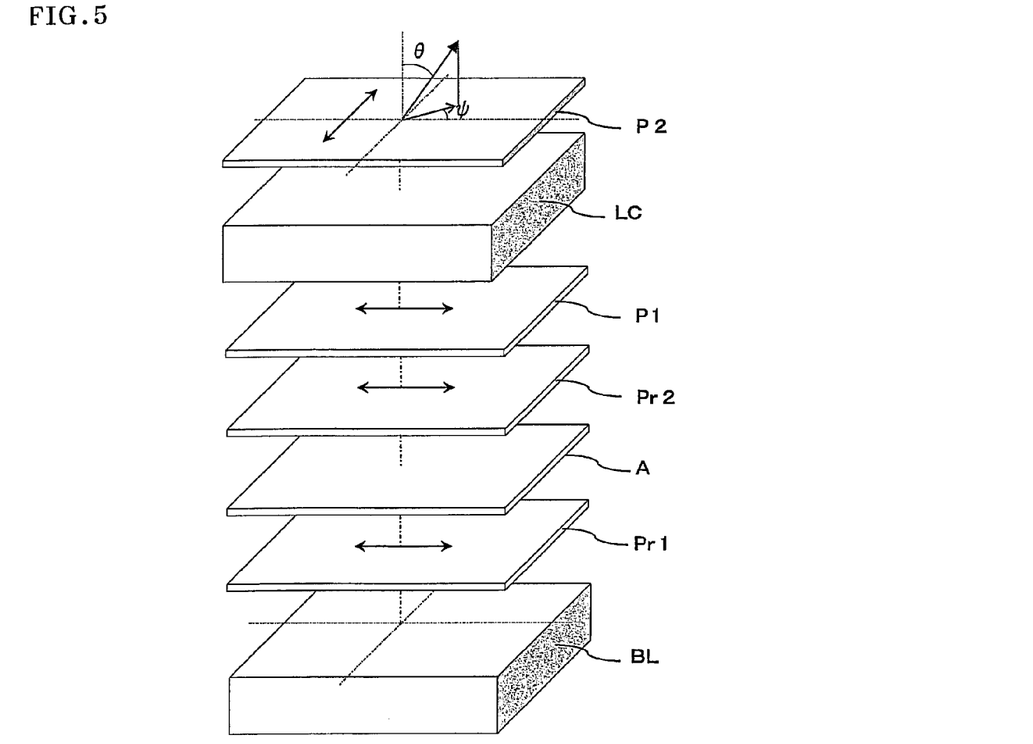
FIG. 5 shows an example of the placement angle of the respective layers of the transmissive liquid crystal display of the invention. The two-headed arrow attached to each polarizing layer indicates the direction of the transmission axis of the layer.

Furthermore, in the transmissive liquid crystal display of the invention, it is also preferably configured to include a reflective linearly-polarizing layer Pr2 between the birefringent layer A and the light source-side absorptive linearly-polarizing layer P1 in such a manner that the light source-side absorptive linearly-polarizing layer P1 and the transmission axes are parallel to each other. In this case, the cross-sectional structure and the arrangement of the respective layers may be as shown in FIGS. 4 and 5. When the reflective linearly-polarizing layer Pr2 is provided, the rate of recycling of light from the light source can be enhanced so that white brightness is enhanced and contrast can be improved. An increase in the rate of recycling of light from the light source by means of having the reflective linearly-polarizing layer Pr2 is described with reference to FIG. 6, while conversion of light beams in the normal direction and oblique directions is followed.

Figure 6:
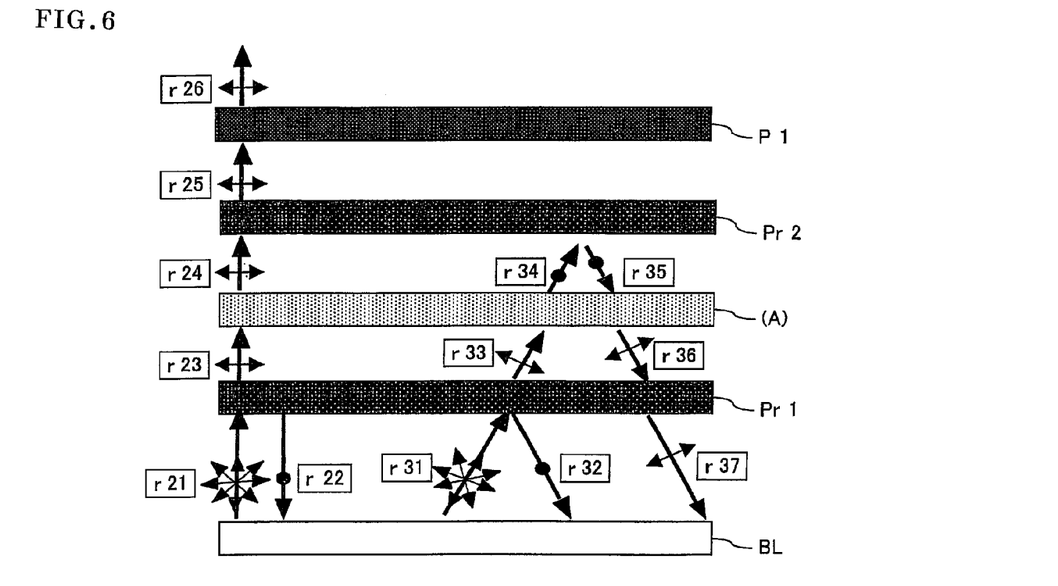
FIG. 6 is a schematic diagram showing an example of the basic mechanism in which a reflective linearly-polarizing layer Pr2 can enhance the light recycling efficiency.

(1) Part r21 of natural light supplied from the light source BL is perpendicularly incident on the reflective linearly-polarizing layer Pr1.

(2) The reflective linearly-polarizing layer Pr1 transmits linearly polarized light r23 and reflects linearly polarized light r22 in a direction orthogonal thereto.

(3) The linearly polarized light r23 passes through the birefringent layer A. The birefringent layer A has a slow axis perpendicular or parallel to the polarization plane of the linearly polarized light r23, or the birefringent layer A has an in-plane retardation of substantially zero. Therefore, the polarization state of the linearly polarized light r23 is not converted so that the birefringent layer A transmits linearly polarized light r24.

(4) The direction of polarization of the linearly polarized light r24 passing through the birefringent layer A is parallel to the direction of the transmission axis of the reflective linearly-polarizing layer Pr2. Therefore, it transmits linearly polarized light r25.

(5) The direction of polarization of the linearly polarized light r25 is parallel to the direction of the transmission axis of the light source-side absorptive linearly-polarizing layer P1. Therefore, it passes straight through the light source-side absorptive linearly-polarizing layer P1.

(6) Linearly polarized light r26 passing through the light source-side absorptive linearly-polarizing layer P1 enters the liquid crystal cell placed thereon and is transmitted without loss.

(7) On the other hand, part r31 of natural light supplied from the light source is obliquely incident on the reflective linearly-polarizing layer Pr1.

(8) The reflective linearly-polarizing layer Pr1 transmits linearly polarized light r33 and reflects light r32 linearly polarized in a direction orthogonal thereto.

(9) The linearly polarized light r33 passes through the birefringent layer A and is converted into a polarization state. In this process, at a specific incident angle, linearly polarized light r34 which is orthogonal to the linearly polarized light 33 is transmitted, because the birefringent layer A has a retardation of $\lambda/2$.

(10) The direction of polarization of the linearly polarized light r34 passing through the birefringent layer A is perpendicular to the direction of the transmission axis of the reflective linearly-polarizing layer Pr2. Therefore, it cannot pass through the reflective linearly-polarizing layer Pr2 but is reflected as linearly polarized light r35.

(11) Based on the same mechanism as described in article (3) above, the birefringent layer A transmits linearly polarized light r36 which is orthogonal to the linearly polarized light r35.

(12) The direction of polarization of the linearly polarized light r36 is parallel to the direction of the transmission axis of the reflective linearly-polarizing layer Pr1. Therefore, the layer Pr1 transmits linearly polarized light r37, which is allowed to return to the light source side and to be recycled. Furthermore, the linearly polarized lights r22 and r32 are similarly allowed to return to the light source side and recycled. Therefore, light from the light source is efficiently used.

(13) When the reflective linearly-polarizing layer Pr2 is provided, not only the linearly polarized light r22 and r23 reflected from the reflective linearly-polarizing layer Pr1 to the light source side but also linearly polarized light r37, which is part of the light once transmitted through the reflective linearly-polarizing layer Pr1, are recycled so that the light recycling rate can be enhanced.

Figure 7:
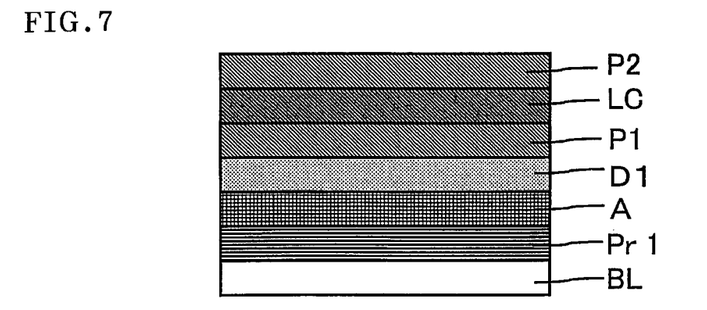
FIG. 7 is a schematic diagram showing an example of the cross-sectional structure of the transmissive liquid crystal display of the invention.

In the transmissive liquid crystal display of the invention, a light source-side light-diffusing layer D1 may be provided between the birefringent layer A and the light source-side absorptive linearly-polarizing layer P1 as shown in FIG. 7 in order to prevent rainbow-like unevenness on the screen, which is caused by Newton's rings. In view of contrast enhancement, the light source-side light-diffusing layer D1 that may be used preferably resists depolarization and furthermore preferably exhibits less back scattering. For example, it may be provided as a light-diffusing pressure-sensitive adhesive layer. A layer in which particles having different refractive index are mixed into the pressure-sensitive adhesive is effectively used as the light-diffusing pressure-sensitive adhesive layer. For example, a fine particle dispersion type diffusing member as disclosed in JP-A Nos. 2000-347006 and 2000-347007 is preferably used. Furthermore, a transparent film (resin) containing particles with a refractive index different from that of the resin, a hologram sheet, a microprism array, a microlens array, or the like may also be used.

The respective layers may be simply placed on one another to form a laminate. In view of workability and light use efficiency, the respective layers are preferably bonded to one another with an adhesive or a pressure-sensitive adhesive to form a laminate. In this case, the adhesive or the pressure-sensitive adhesive is preferably transparent, preferably shows no absorption in the visible light range, and preferably has a refractive index as close as possible to that of each layer, in view of suppressing surface reflection. From this point of view, for example, acryl-based pressure-sensitive adhesives or the like are preferably used. Furthermore, the diffusing pressure-sensitive adhesive layer described above, in which particles having different refractive index are mixed into the pressure-sensitive adhesive, may also be used.

If necessary, particles for controlling the diffusion degree can be added to impart isotropic scattering properties, or an ultraviolet absorbing agent, an antioxidant, a surfactant for imparting leveling properties for film production or the like may be appropriately added to each layer and the adhesive layer or the pressure-sensitive adhesive layer. The liquid crystal display may be formed according to conventional techniques. Specifically, the liquid crystal display may be generally formed by appropriately assembling the liquid crystal cell, polarizing plates or optical films, and optional components such as a lighting system and incorporating a drive circuit. In the invention, the liquid crystal display may be formed according to conventional techniques without particular limitation, except that the reflective linearly-polarizing layer Pr1, the birefringent layer A and the light source-side absorptive linearly-polarizing layer P1 are placed between the liquid crystal cell and the light source in such a manner that the conditions described above are satisfied.

Examples of a liquid crystal cell used in the liquid crystal display include various liquid crystal cells such as twisted nematic (TN) mode, supertwisted nematic (STN) mode, homogeneous alignment (ECB) mode, vertical alignment (VA) mode, in plane switching (IPS) mode, fringe field switching (FFS) mode, bend nematic (OCB) mode, hybrid alignment (HAN) mode, ferroelectric liquid crystal (SSFLC) mode, and antiferroelctric liquid crystal (AFLC) mode liquid crystal cells. Among them, it is preferable to use the retardation film and the polarizing plate of the present invention, by combining, in particular, with TN mode, VA mode, IPS mode, OCB mode, FFS mode, and OCB mode liquid crystal cells. Most preferably, a retardation film and the polarizing plate of the present invention are used by combining with an IPS mode or FFS mode liquid crystal cell.

As backlight, direct under-type backlight, sidelight-type backlight, and planner light source can be used. In addition, a reflecting plate can be used with backlight. Further, upon formation of a liquid crystal display, one or more layers of an appropriate part such as a diffusion plate, an antiglare layer, a reflection preventing membrane, a protecting plate, a prism array, a lens array sheet, and a light diffusion plate can be arranged at an appropriate position.

The viewer-side linearly-polarizing layer P2 may be placed on the viewer side of the liquid crystal cell in such a manner that the transmission axes of the viewer-side linearly-polarizing layer P2 and the light source-side absorptive linearly-polarizing layer P1 are substantially perpendicular to each other. The viewer-side linearly-polarizing layer P2 to be used is preferably an absorptive linearly-polarizing layer and an absorptive linearly-polarizing layer having a protective film on one or both sides thereof is generally used, similarly to the light source-side absorptive linearly-polarizing layer P1. The viewer-side linearly-polarizing layer P2 to be used may be the same as or different from the light source-side absorptive linearly-polarizing layer P1.

A hard coat layer may be prepared, or antireflection processing, processing aiming at sticking prevention, diffusion or anti glare may be performed onto a face of the protective film on which the polarizing layer has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Figure 8:
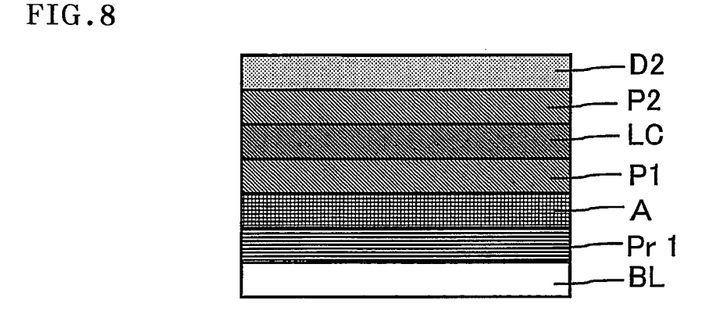
FIG. 8 is a schematic diagram showing an example of the cross-sectional structure of the transmissive liquid crystal display of the invention.

In the transmissive liquid crystal display of the invention, a viewer-side light-diffusing layer D2 is preferably placed on the viewer side from the viewer-side linearly-polarizing layer P2 as shown in FIG. 8 in order to enhance white brightness in oblique directions and to expand the viewing angle. The viewer-side light-diffusing layer D2 may be formed by a method of laminating a light scattering plate, a hologram sheet, a microprism array, a microlens array, or the like as an independent optical layer, by a method of imparting the diffusing function to the antiglare layer, or the like. Among them, a light-diffusing layer with substantially no back scattering is preferred, and, for example, a light scattering plate with a haze of 80% to 90% as disclosed in JP-A Nos. 2000-347006 and 2000-347007 is preferably used. Further, in view of reducing variations in viewing angle characteristics with azimuth angle and producing uniform display, an anisotropic light-scattering film as disclosed in such as JP-A No. 2000-171619 may also be used.

In the transmissive liquid crystal display of the invention, an optical film which is made of various polymer materials, liquid crystal materials or the like may also be used as an optical compensation layer for the purpose of enhancing image quality. Such an optical compensation layer may be placed between the light source-side absorptive linearly-polarizing layer P1 and the liquid crystal cell and/or between the viewer-side linearly-polarizing layer P2 and the liquid crystal cell. The optical compensation layer may be appropriately selected depending on the mode of the liquid crystal cell (such as TN, VA, OCB, or IPS).

A material or a method for producing such an optical compensation layer is not particularly limited, and examples include a layer of a cholesteric liquid crystal having a selective reflection wavelength outside the visible light range (380 nm to 780 nm) and having a fixed planar alignment, a layer of a rod-shaped liquid crystal having a fixed homeotropic alignment, a layer based on a discotic liquid crystal having a columnar or nematic alignment, a layer including an in-plane aligned crystal with negative uniaxiality, an aligned polymer layer, an aligned film composed of a liquid crystal material such as a liquid crystal polymer, a layer including an aligned layer of a liquid crystal material supported on a film, and a layer produced by appropriately stretching any of these materials. Further, a laminate of two or more of these layers may also be used.

EXAMPLES

The invention is more specifically described herein below with reference to examples, however, the invention is not intended to be limit to examples described below.

Here, the in-plane retardation Re and the thickness direction retardation Rth were determined as described below.

The retardation of the film in the normal direction and the retardation of the film inclined by 40° with respect to the slow axis were measure at a wavelength of 550 nm using an automatic birefringence measuring device (automatic birefringence analyzer "KOBRA 21ADH" manufactured by Oji Scientific Instruments). These values were used to calculate the refractive index nx of the film in a direction where the in-plane refractive index is maximum, the refractive index ny of the film in a direction perpendicular thereto, and the refractive index nz of the film in its thickness direction. The in-plane retardation (nx−ny)×d and the thickness direction retardation (nx−nz)×d were calculated from these values and the thickness d.

Here, when the retardation of the birefringent layer was measured, the layer was separated from the substrate and then transferred onto a glass plate with a pressure-sensitive adhesive in order to avoid the effect of the birefringence which the substrate has.

Application to TN Mode Liquid Crystal Cell

Example 1

A coating solution was prepared by adjusting and blending a photopolymerizable nematic liquid crystal monomer (PalioColor LC-242 (trade name) manufactured by BASF), a chiral agent ("PalioColor LC-756" (trade name) manufactured by BASF), a photopolymerization initiator ("Irgacure 906" (trade name) manufactured by Ciba Specialty Chemicals Inc.), and a solvent (cyclopentanone) in such a manner that the selective reflection wavelength was 350 nm. The coating solution was applied to a biaxially-stretched PET film with a wire bar so as to give a thickness of 4 µm after drying, and then dried. Thereafter, the temperature was raised to the isotropy transition temperature of the liquid crystal monomer, and then, the coating was gradually cooled to form a monomer layer having a uniform alignment state. The resulting monomer layer was irradiated with UV light for fixing the alignment state, thereby obtaining a birefringent layer. The birefringent layer had an in-plane retardation Re of 1 nm and a thickness direction retardation Rth of 660 nm.

Next, a 19 inch TN-mode liquid crystal monitor (LX1951D (trade name) manufactured by LG Electronics) using a commercially available reflective polarizing plate ("D-BEF" (trade name) manufactured by 3M Company) was disassembled. The birefringent layer was transferred from the PET film to the surface of the backlight-side absorptive linearly-polarizing plate of the liquid crystal panel with a transparent acryl-based pressure-sensitive adhesive. Thereafter, a transmissive liquid crystal display was obtained by reassembling.

Example 2

A transmissive liquid crystal display was obtained using a light-diffusing pressure-sensitive adhesive which was prepared by previously dispersing sphere particles of silicone with a particle size of 4.2 µm as the acryl-based pressure-sensitive adhesive used in transferring of the birefringent layer to the surface of the polarizing plate in Example 1.

Figure 9:
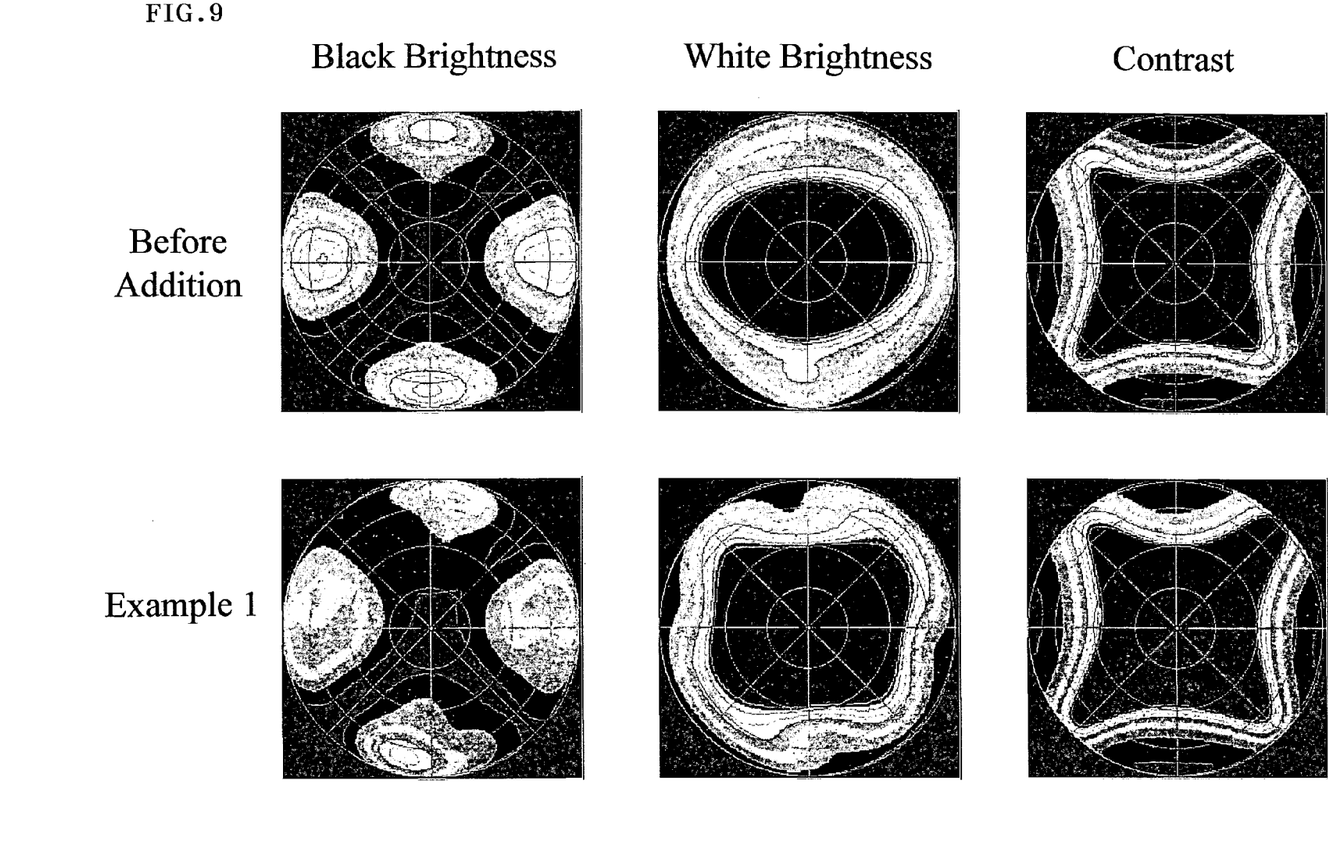
FIG. 9 is a view showing the viewing angle characteristics of each of the liquid crystal displays of Example 1 and before the addition of the birefringent layer with respect to black brightness, white brightness and contrast.
Figure 10:
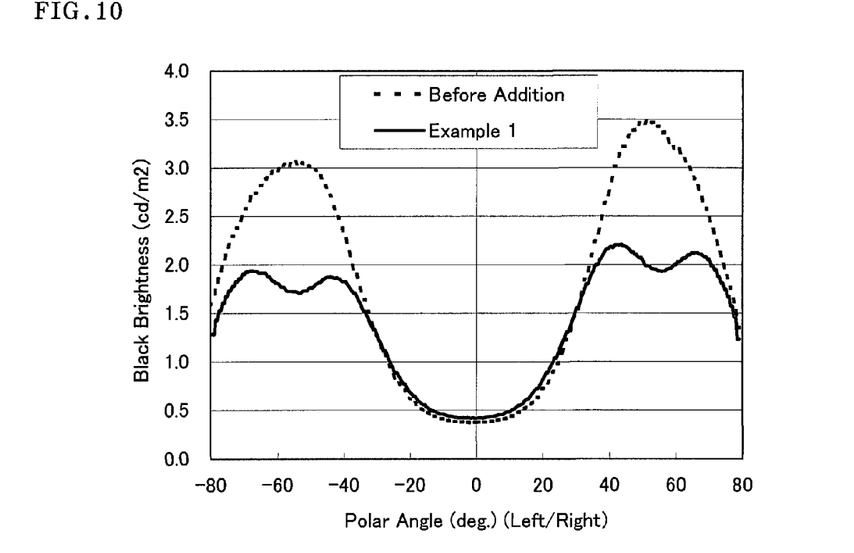
FIG. 10 is a graph showing the polar angle dependency of the black brightness of each of the liquid crystal displays of Example 1 and before the addition of the birefringent layer at an azimuth angle of 0°, in which the solid line indicates Example 1 according to the invention, and the broken line indicates the product before the addition of the birefringent layer.

The brightness and the contrast characteristics of each of the transmissive liquid crystal display of Example 1 and the transmissive liquid crystal display before the addition of the birefringent layer were evaluated using "ConoScope" manufactured by AUTRONIC-MELCHERS GmbH. The results are shown in FIGS. 9 and 10. A comparison between them shows that according to the invention, black brightness is reduced at oblique viewing angles, namely light leakage is reduced.

Application to VA Mode Liquid Crystal Cell

Example 3

To a reaction vessel (500 mL) equipped with a mechanical stirrer, a Dean-Stark apparatus, a nitrogen-introducing tube, a thermometer, and a condenser tube were added 17.77 g (40 mmol) of 2,2'-bis(3,4-dicarboxyphenyl)hexafluoropropanoic dianhydride (manufactured by Clariant (Japan) K.K.) and 12.81 g (40 mmol) of 2,2-bis(trifluoromethyl)-4,4'-diaminobiphenyl (manufactured by Wakayama Seika Kogyo Co., Ltd.). Subsequently, a solution in which 2.58 g (20 mmol) of isoquinoline is dissolved in 275.21 g of m-cresol was added to the reaction vessel, and the mixture was stirred (600 rpm) at 23° C. for 1 hour to give a uniform solution. The reaction vessel was then heated with an oil bath so that the temperature of the inside of the reaction vessel reached 180° C., and the mixture was stirred for 5 hours with the temperature maintained, resulting in an yellow solution. After the solution was further stirred for 3 hours, heating and stirring were stopped, and the product was allowed to cool to room temperature so that a polymer was precipitated in the form of a gel.

Acetone was added to the yellow solution in the reaction vessel so that the above gel was completely dissolved to prepare a diluted solution (7% by weight). The diluted solution was gradually added to 2 L of isopropyl alcohol under stirring to give a white powder precipitate. The powder was separated by filtration and then added into 1.5 L of isopropyl alcohol for washing. After the same process was performed once again to wash, the powder was separated again by filtration. In an air circulation type thermostatic oven, the powder was dried at 60° C. for 48 hours and then dried at 150° C. for 7 hours to give a powder of polyimide represented by structural formula (1) below (85% yield). The polyimide had a weight average molecular weight (Mw) of 124,000 and an imidation rate of 99.9%.

[Formula 1]

(I)

The polyimide powder was dissolved in methyl isobutyl ketone to prepare a 15% by weight of polyimide solution. This solution was unidirectionally applied to the surface of a 75 μm-thick polyethylene terephthalate film (Lumirror S27-E (trade name) manufactured by Toray Industries, Inc.) with a comma coater. The coating was then dried in an air circulation type drying oven at 120° C. so that the solvent was evaporated. The above polyethylene terephthalate film was then separated so that a 5 μm-thick birefringent layer made of polyimide was obtained. This birefringent layer had an in-plane retardation Re of 1 nm and a thickness direction retardation Rth of 200 nm.

A 20 inch VA-mode liquid crystal television ("KDL-20J3000" (trade name) manufactured by Sony Corporation) using a commercially available reflective polarizing plate ("D-BEF" (trade name) manufactured by 3M Company) was disassembled. Three sheets of the polyimide birefringent layer were laminated and bonded to the surface of the backlight-side absorptive linearly-polarizing plate of the liquid crystal panel with a transparent acrylic pressure-sensitive adhesive. Thereafter, a transmissive liquid crystal display was obtained by reassembling the components of the liquid crystal television. Here, the birefringent layer of the three sheets of polyimide birefringent layers bonded to one another had an in-plane retardation Re of 3 nm and a thickness direction retardation Rth of 600 nm.

Example 4

A transmissive liquid crystal display was obtained in the same manner as in Example 3, except that a laminate of five sheets of the polyimide birefringent layer was used in place of the laminate of three sheets of the polyimide birefringent layer. Here, the birefringent layer of the five sheets of polyimide birefringent layers bonded to one another had an in-plane retardation Re of 5 nm and a thickness direction retardation Rth of 1,000 nm.

Example 5

A transmissive liquid crystal display was obtained in the same manner as in Example 3, except that a laminate of ten sheets of the polyimide birefringent layer was used in place of the laminate of three sheets of the polyimide birefringent layer. Here, the birefringent layer of the ten sheets of polyimide birefringent layers bonded to one another had an in-plane retardation Re of 10 nm and a thickness direction retardation Rth of 2,000 nm.

Example 6

A transmissive liquid crystal display was obtained in the same manner as in Example 3, except that a laminate of 15 sheets of the polyimide birefringent layer was used in place of the laminate of three sheets of the polyimide birefringent layer. Here, the birefringent layer of the 15 sheets of polyimide birefringent layers bonded to one another had an in-plane retardation Re of 15 nm and a thickness direction retardation Rth of 3,000 nm.

Example 7

A transmissive liquid crystal display was obtained in the same manner as in Example 3, except that a laminate of 20 sheets of the polyimide birefringent layer was used in place of the laminate of three sheets of the polyimide birefringent layer. Here, the birefringent layer of the 20 sheets of polyimide birefringent layers bonded to one another had an in-plane retardation Re of 20 nm and a thickness direction retardation Rth of 4,000 nm.

Comparative Example 1

A transmissive liquid crystal display was obtained in the same manner as in Example 3, except that only a single piece of the polyimide birefringent layer was used in place of the laminate of three sheets of the polyimide birefringent layer.

Comparative Example 2

A 20 inch VA-mode liquid crystal television ("KDL-20J3000" (trade name) manufactured by Sony Corporation)

using a commercially available reflective polarizing plate ("D-BEF" (trade name) manufactured by 3M Company) was used as it was.

The brightness (black brightness) of the transmissive liquid crystal display of each of Examples 3 to 7 and Comparative Examples 1 and 2 was measured with "ConoScope" (trade name) manufactured by AUTRONIC-MELCHERS GmbH at a polar angle of 60° and azimuth angles in the range of 0 to 360°. The maximum value of the brightness of each liquid crystal display at a polar angle of 60° and azimuth angles in the range of 0 to 360° is shown in Table 1.

TABLE 1

|  | Rth of the Birefringent Layer (nm) | Brightness (cd/cm$^2$) |
| --- | --- | --- |
| Example 3 | 600 | 2.592 |
| Example 4 | 1000 | 2.848 |
| Example 5 | 2000 | 2.940 |
| Example 6 | 3000 | 3.122 |
| Example 7 | 4000 | 2.715 |
| Comparative Example 1 | 200 | 3.398 |
| Comparative Example 2 | — | 3.397 |

Table 1 shows that Comparative Example 1 with a low thickness direction retardation did not produce the effect of reducing black brightness, compared with Comparative Example 2 without birefringent layer, while black brightness was reduced at a polar angle of 60° in each Example. As described above, the liquid crystal display of the invention can suppress light leakage in oblique directions and consequently achieve high-contrast image display.

The invention claimed is:

1. A transmissive liquid crystal display, comprising:
a light source (BL), a reflective linearly-polarizing layer (Pr1), a birefringent layer (A), a light source-side absorptive linearly-polarizing layer (P1), a liquid crystal cell (LC), and a viewer-side linearly-polarizing layer (P2) which are arranged in this order and satisfy all the following conditions:
(a) transmission axes of the reflective linearly-polarizing layer (Pr1) and the light source-side absorptive linearly-polarizing layer (P1) are arranged substantially parallel to each other;
(b) said birefringent layer has a thickness direction retardation Rth which satisfies the relation 250 nm≤Rth≤1000 nm; and
(c) of linearly polarized light emitted from the light source (BL) and transmitted through the reflective linearly-polarizing layer (Pr1), the birefringent layer (A) makes substantially no change in the polarization state of linearly polarized light in the normal direction while the birefringent layer (A) makes a change in the polarization state of linearly polarized light in an oblique direction,
wherein said birefringent layer (A) has an in-plane retardation Re of from 10 nm to 90 nm, and a slow axis of the birefringent layer (A) and a transmission axis of the reflective linearly-polarizing layer (Pr1) are substantially parallel or perpendicular to each other.

2. The transmissive liquid crystal display according to claim 1, wherein said birefringent layer (A) has an in-plane retardation Re and a thickness direction retardation Rth which satisfy the relation: 400 nm≤Rth−2×Re≤800 nm.

3. The transmissive liquid crystal display according to claim 1, comprising a reflective linearly-polarizing layer (Pr2) between said birefringent layer (A) and said light source-side absorptive linearly-polarizing layer (P1) in such a manner that the light source-side absorptive linearly-polarizing layer (P1) and the transmission axes are parallel to each other.

4. The transmissive liquid crystal display according to claim 1, comprising a light source-side light-diffusing layer (D1) between said birefringent layer (A) and said light source-side absorptive linearly-polarizing layer (P1).

5. The transmissive liquid crystal display according to claim 1, comprising a viewer-side light-diffusing layer (D2) on the viewer side from the viewer-side linearly-polarizing layer (P2).

6. The transmissive liquid crystal display according to claim 1, wherein said reflective linearly-polarizing layer (Pr1), said birefringent layer (A) and said light source-side absorptive linearly-polarizing layer (P1) are integrally bonded to one another with a pressure-sensitive adhesive.

7. A laminated polarizing plate for use in the transmissive liquid crystal display according to claim 1, comprising a reflective linearly-polarizing layer (Pr1), a birefringent layer (A) and a light source-side absorptive linearly-polarizing layer (P1) which are arranged in this order.

8. A polarized light source device for use in the transmissive liquid crystal display according to claim 1, comprising a light source (BL), a reflective linearly-polarizing layer (Pr1), a birefringent layer (A), and a light source-side absorptive linearly-polarizing layer (P1) which are arranged in this order.

* * * * *